UNITED STATES PATENT OFFICE.

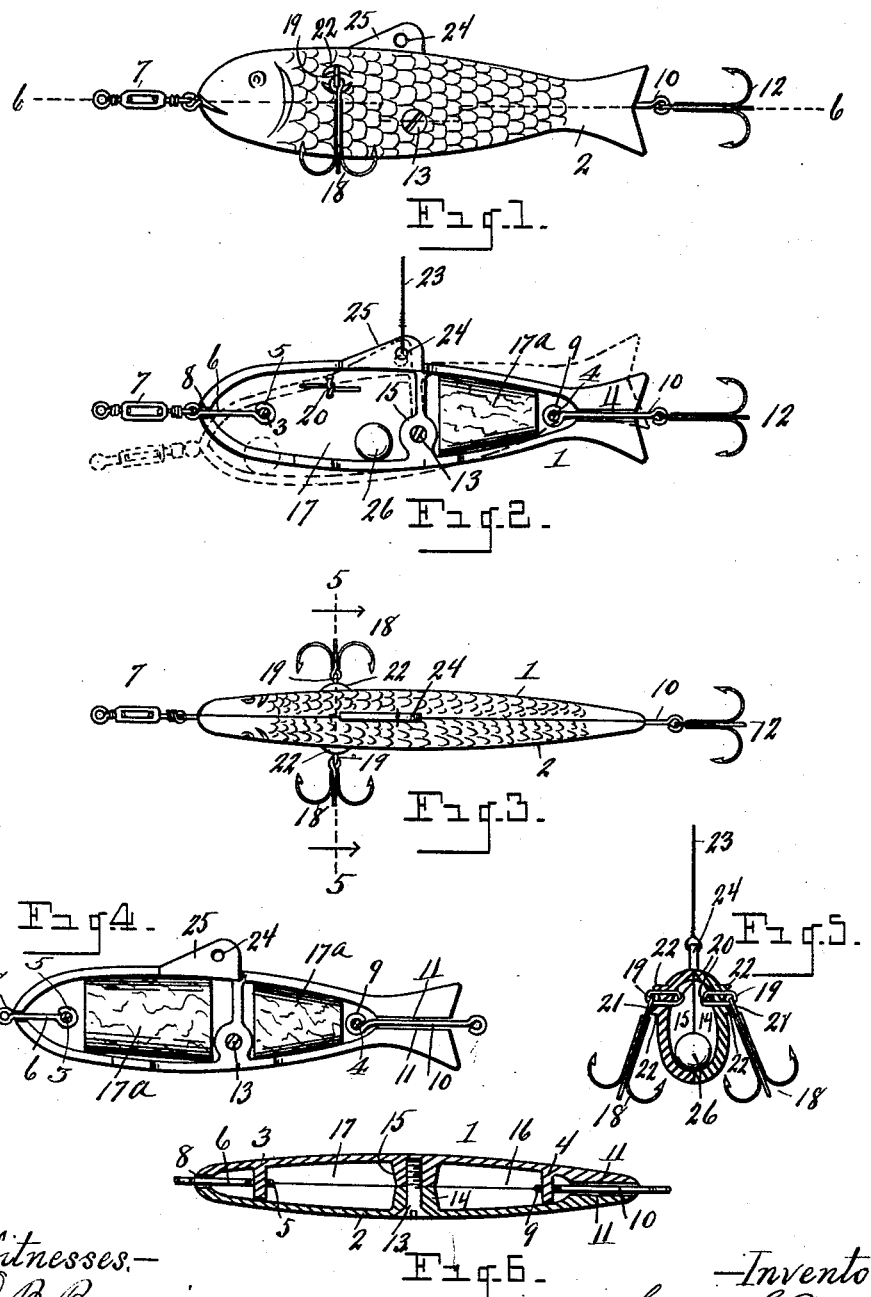

HIRAM H. PASSAGE, OF PLYMOUTH, MICHIGAN, ASSIGNOR OF ONE-HALF TO GEORGE E. VAN DE CAR, OF PLYMOUTH, MICHIGAN.

ARTIFICIAL BAIT.

No. 841,429.　　　Specification of Letters Patent.　　　Patented Jan. 15, 1907.

Application filed May 9, 1906. Serial No. 315,862.

*To all whom it may concern:*

Be it known that I, HIRAM H. PASSAGE, a citizen of the United States, residing at Plymouth, in the county of Wayne, State of Michigan, have invented certain new and useful Improvements in Artificial Bait; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in artificial bait; and it consists in the construction and arrangement of parts hereinafter fully set forth, and pointed out particularly in the claims.

The object of the invention is to provide an artificial bait in simulation of a minnow of such construction as to enable suitable hooks to be readily and securely attached thereto and to allow the body of the minnow to be varied as to its specific gravity and balance for the purpose of maintaining the minnow at a proper level when trolling in a current or in still water and providing for imparting a movement to the minnow in simulation of life when still-fishing through the ice or with a drop-line. A further arrangement provides for keeping the side hooks separated, so as to prevent said hooks becoming entangled over the back or below the belly of the minnow.

The above object is attained by the structure illustrated in the accompanying drawings, in which—

Figure 1 is a side elevation of a bait involving my invention. Fig. 2 is a side elevation of the bait with one side removed, showing the hollow interior having cork or other buoyant material in the rear portion thereof and a weighted ball in the forward portion adapted to roll about therein. Fig. 3 is a plan view of Fig. 1. Fig. 4 is an elevation similar to Fig. 2, showing the hollow interior of the minnow filled with cork or other buoyant material. Fig. 5 is a transverse section as on line 5 5 of Fig. 3. Fig. 6 is a longitudinal section as on line 6 6 of Fig. 1.

This artificial bait, as before stated, is made in simulation of a minnow and is preferably formed in two parts or halves 1 and 2, cast of aluminium, and forming when placed together an artificial bait or minnow having a hollow body. Extending from part 1 of the body near the head and tail thereof are the pins 3 and 4, respectively, which project laterally across the hollow space to the inner wall of the opposite part 2. The pin 3 is adapted to receive the eye 5 on the inner end of the link 6, which extends outwardly through the head of the minnow at the mouth and is attached to the swivel 7, to which the ordinary line may be connected, the opposite sides of the minnow being recessed, as at 8, to permit the link to lie therein and the parts of the minnow to close tightly together.

Upon the transverse pin 4 near the tail of the minnow is engaged the eye 9 of the link 10, which lies in longitudinal recesses 11 in the opposed sides of the minnow at the tail and projects sufficiently beyond the tail to receive the hooks 12, to the shank of which said link is attached.

The sides or parts of the minnow are held together by means of the transverse screw 13, which passes freely through an inwardly-extending boss 14 on said part 2 and screws into an inwardly-extending boss 15 on the part 1. By means of said screw the parts may be bound tightly together and the links 6 and 10 firmly secured to the body of the minnow. The sides of the minnow being concavo-convex in cross-section when placed together, as described, a chamber 16 is formed in the rear portion of the body and a chamber 17 in the forward portion thereof. Said chambers are filled with cork 17ª or other buoyant material for the purpose of increasing the buoyancy of the bait when it is desired in trolling to maintain the bait near the surface of the water. The body may be made heavier by removing the cork or by substituting for the cork a heavier material.

For the purpose of attaching the opposed hooks 18 to the bait near its forward end, on opposite sides thereof, the opposed parts of the bait are provided through their walls with adjacent apertures through which may be passed the ends of a looped attaching-wire 19, the ends of said wire being twisted together upon the interior of the body, as shown at 20. Before being passed through the apertures in the parts of the body the attaching-wires are first passed through the eyes 21 in the shank of said hooks, whereby after the ends of the wires shall have been secured within the body said hooks are securely attached to the sides of the bait in a manner to allow freedom of movement.

It will be noted on referring to Figs. 1, 3, and 5 that above and below the apertures through the parts of the minnow through which the attaching-wires 19 pass are formed crescent-shaped projections or bosses 22, which engage the shanks of the hooks and prevent the hooks swinging together under the body of the minnow or over the back thereof and becoming entangled.

When fishing through the ice for the purpose of decoying the fish to bring them within reach of a spear or when fishing with a drop-line, the line 23, as shown in Fig. 5, is attached in the opening 24, formed through the back fin 25, which is made integral with one of the parts of the body, enabling said bait to be maintained in a horizontal position. When so used, the cork may be removed from the forward chamber 17 and a weighted ball 26 placed therein, which by a manipulation of the line 23 may be caused to move about in the chamber 17 and impart a life-like movement to the bait, as shown by dotted lines in Fig. 2. By removing the screw 13 one of the sides of the bait may be readily removed for the purpose of attaching or removing hooks or for removing or inserting the cork or the spherical weight 26.

Having thus fully set forth my invention, what I claim as new, and desire to secure by Letters Patent, is—

1. An artificial bait, comprising concavo-convex body-sections detachably secured together, laterally-extending pins within the hollow body, hook-retaining devices secured to said pins and projecting beyond the ends of the body.

2. An artificial bait, comprising a hollow body composed of detachable sections, means for securing said sections together, and a buoyant material within said hollow body.

3. An artificial bait, composed of concavo-convex sections detachably joined together to form a chamber within the body, hook-retaining devices secured between the sections of the body at the ends, and a filling of buoyant material within said chamber.

4. An artificial bait, comprising detachable body-sections, hook-retaining devices projecting through the walls of said sections, hooks secured to said retaining devices, and projections upon the walls of the body-sections around said retaining devices to engage the shanks of the hooks.

5. An artificial bait, comprising detachable concavo-convex body-sections joined with their concaved sides together, forming a body with an inner chamber, hook-retaining devices projecting from said body, and a spherical weight within said chamber.

In testimony whereof I sign this specification in the presence of two witnesses.

HIRAM H. PASSAGE.

Witnesses:
  E. P. LOMBARD,
  W. B. LOMBARD.